(12) United States Patent
Shih

(10) Patent No.: US 10,612,743 B2
(45) Date of Patent: Apr. 7, 2020

(54) VEHICLE LAMP

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/118,911

(22) Filed: Aug. 31, 2018

(65) Prior Publication Data
US 2020/0072431 A1    Mar. 5, 2020

(51) Int. Cl.
*F21S 41/365*    (2018.01)
*B62J 6/02*    (2020.01)
*F21S 41/24*    (2018.01)

(52) U.S. Cl.
CPC .............. *F21S 41/365* (2018.01); *B62J 6/02* (2013.01); *F21S 41/24* (2018.01)

(58) Field of Classification Search
CPC .......... F21S 41/365; F21S 41/24; F21S 41/33; F21S 41/36
See application file for complete search history.

(56) References Cited

U.S. PATENT DOCUMENTS 6,471,383 B1 * 10/2002 Oyama .................. F21S 41/17
                                                                                362/517

* cited by examiner

*Primary Examiner* — Anne M Hines
(74) *Attorney, Agent, or Firm* — Burris Law, PLLC

(57) ABSTRACT

A vehicle lamp includes a lighting unit, a lens, an optical transparent member and a light directing unit. The lens is disposed in front of the lighting unit for radiating forwardly light rays received from the lighting unit. The optical transparent member protrudes sidewardly from one side of the lens. The light directing unit is disposed between the lighting unit and the optical transparent member for forwardly directing part of light rays emitted from the lighting unit to the optical transparent member. The optical transparent member radiates forwardly the light rays received from the light directing unit, whereby a light emitting area of the vehicle lamp is increased.

7 Claims, 7 Drawing Sheets

VEHICLE LAMP

FIELD

The disclosure relates to a lamp, and more particularly to a vehicle lamp.

BACKGROUND

FIG. 1 illustrates a conventional vehicle lamp 9 for mounting to a motorcycle. The conventional vehicle lamp 9 includes a housing 91 and two left-right spaced-apart lighting units 92 disposed in the housing 91. A distance (d) between boundaries of light-emitting areas of the two lighting units 92 is generally greater than 75 mm. According to Economic Commission for Europe (ECE) regulations, because the distance (d) is greater than 75 mm, each lighting unit 92 is regarded as an individual vehicle lamp. In an optical test, each lighting unit 92 is independently activated and tested to examine whether or not the requirements of Class D headlamp according to the ECE regulations can be fulfilled. Because each lighting unit 92 must overcome the test, high precision optical design and high precision manufacturing operations are needed for each lighting unit 92, thereby increasing manufacturing complexity and cost.

Based on the ECE regulations, if the distance (d) between the boundaries of the light-emitting areas of the two lighting units 92 is smaller than 75 mm, the two lighting units 92 can be declared as a single lamp, and thus can be simultaneously activated to test whether or not the two lighting units 92 put together can fulfill the requirements of Class D headlamps. As the two lighting units 92 need not be separately and singly tested, it is advantageous to reduce design complexity and fabrication costs. Thus, it is desirable to reduce the distance between the boundaries of the light emitting areas of the two lighting units 92 for enabling the two lighting units to be regarded as a single lamp, while still allowing the distance between the two lighting units 92 to maintain unchanged.

SUMMARY

Therefore, an object of the disclosure is to provide a vehicle lamp that can alleviate at least one of the drawbacks of the prior art.

According to the disclosure, a vehicle lamp includes a lighting unit, a lens, an optical transparent member and a light directing unit.

The lens is disposed in front of the lighting unit for radiating forwardly light rays received from the lighting unit.

The optical transparent member protrudes sidewardly from one side of the lens.

The light directing unit is disposed between the lighting unit and the optical transparent member for forwardly directing a part of light rays emitted from the lighting unit to the optical transparent member.

The optical transparent member radiates forwardly the light rays received from the light directing unit, whereby a light emitting area of the vehicle lamp is increased.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
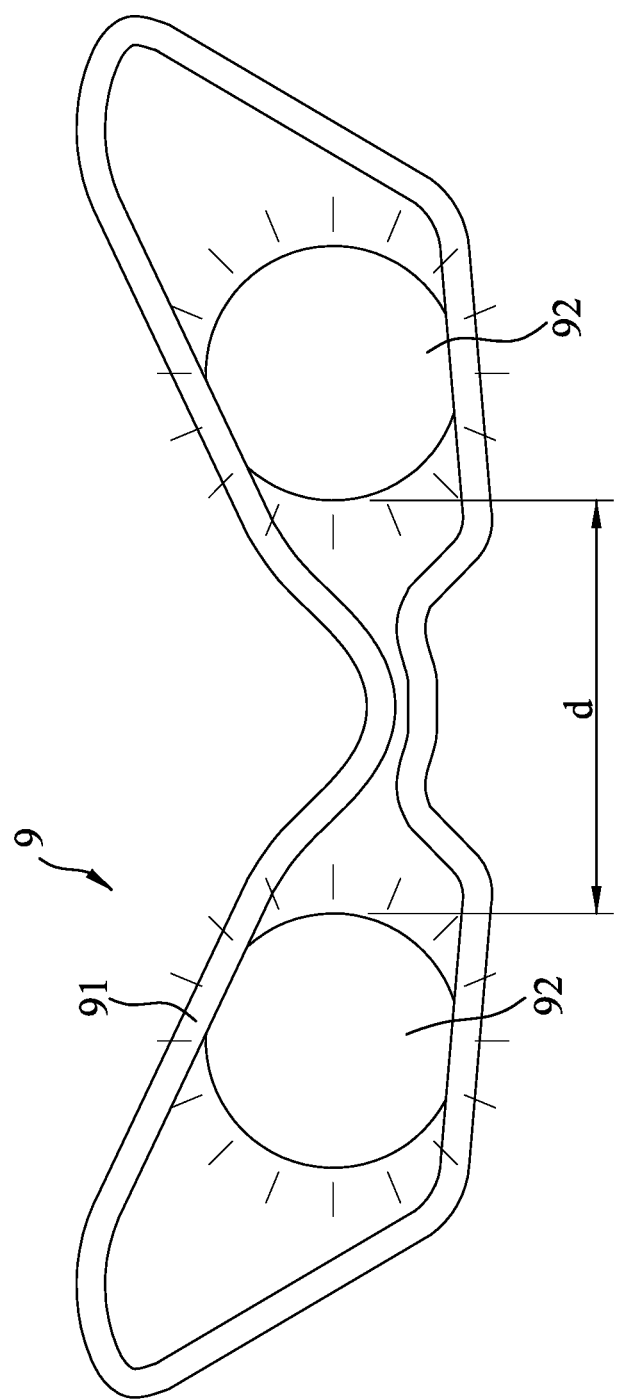
FIG. 1 illustrates a conventional vehicle lamp.
Figure 2:
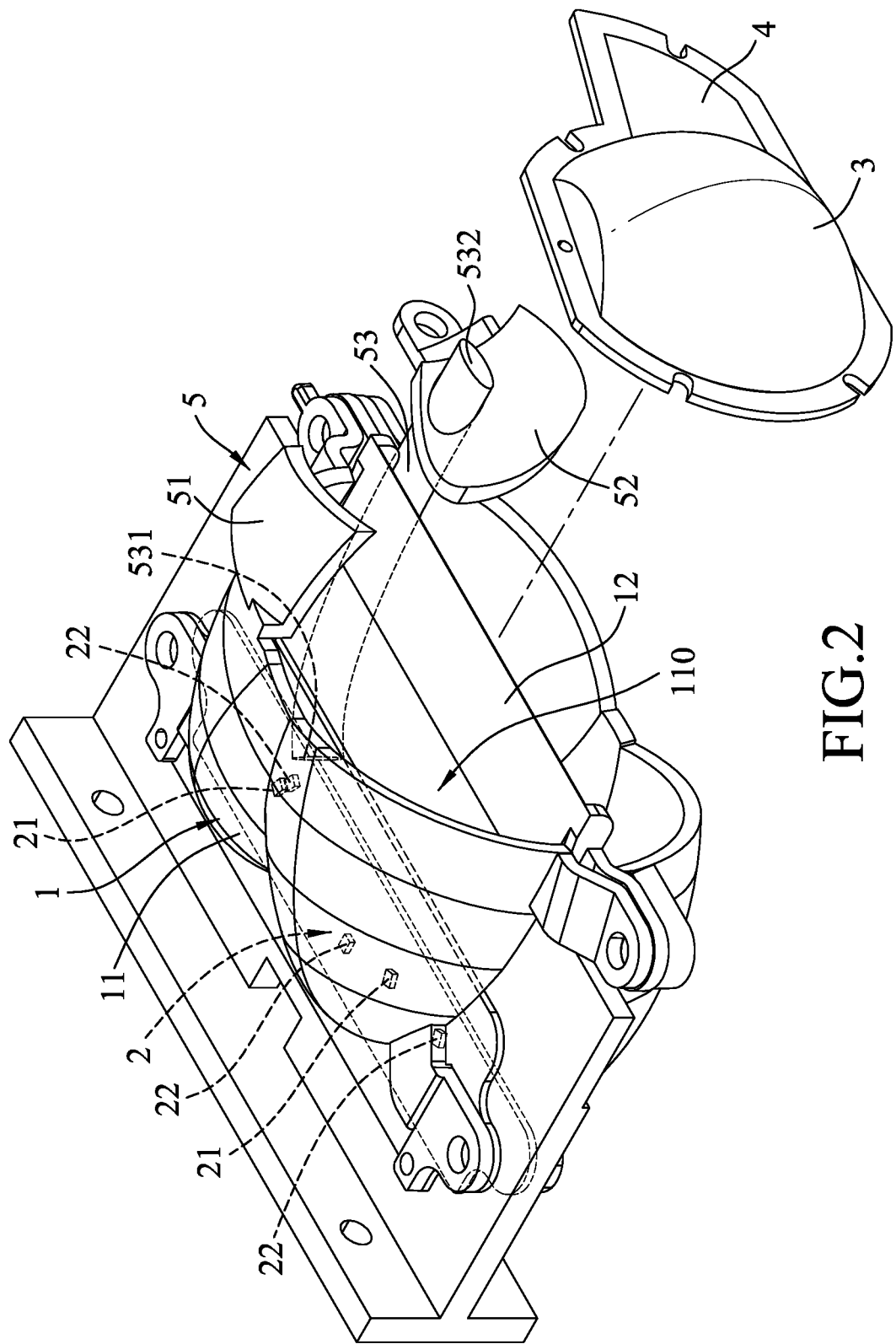
FIG. 2 is an exploded perspective view of an embodiment of a vehicle lamp according to the disclosure.
Figure 3:
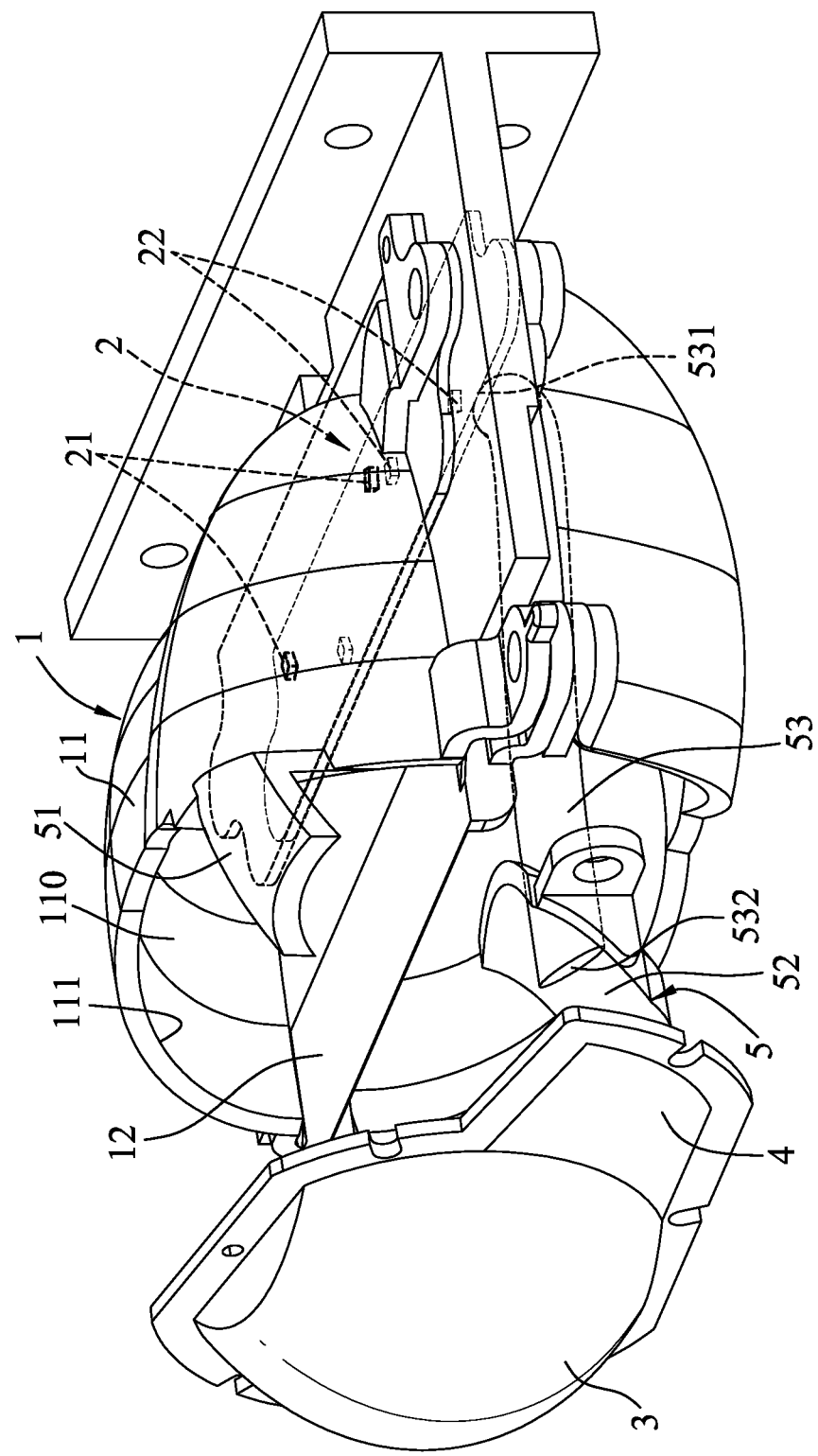
FIG. 3 is an exploded perspective view of the embodiment, taken from another view angle.
Figure 4:
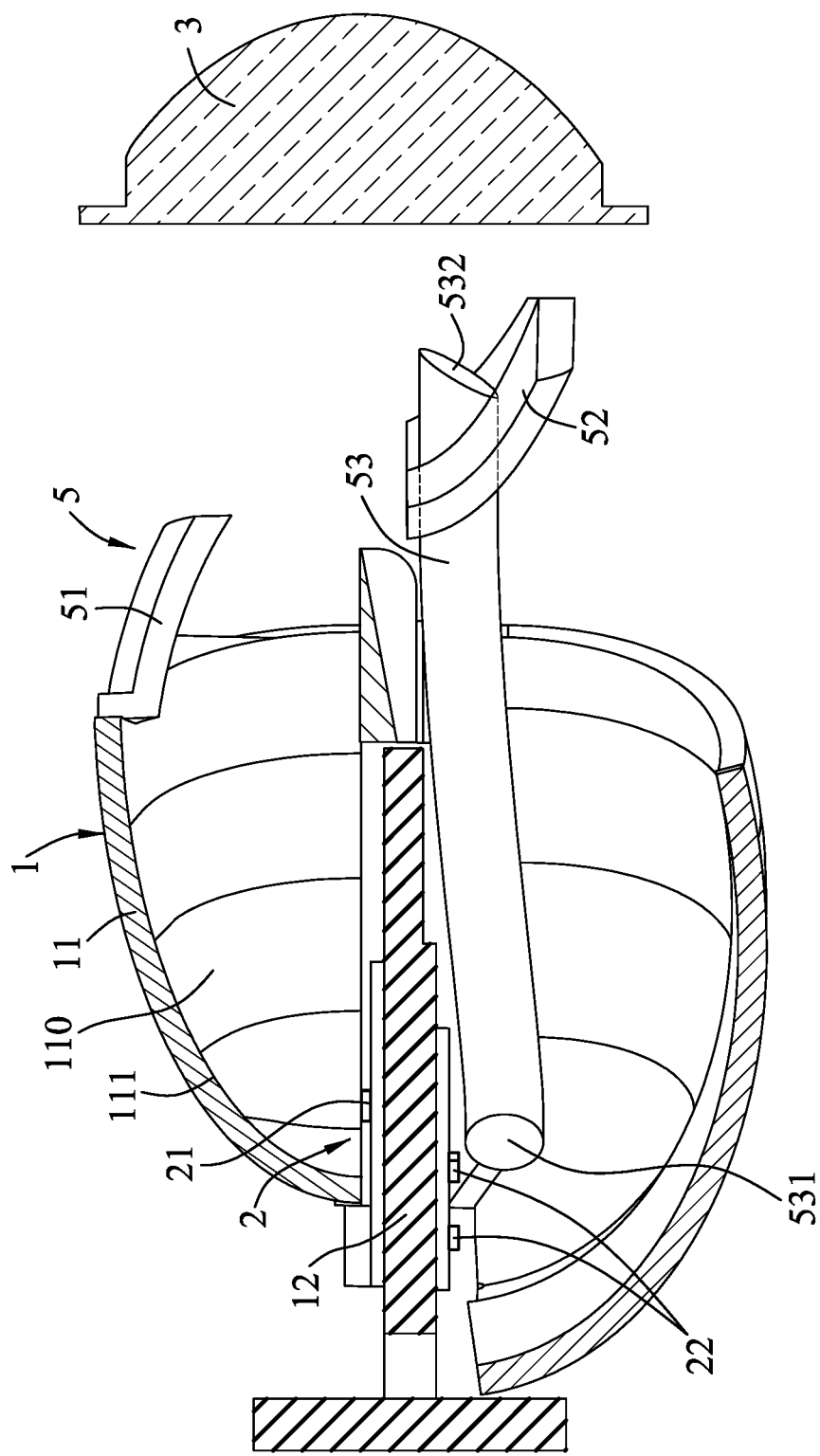
FIG. 4 is a sectional view of the embodiment.

Referring to FIGS. 2 to 4, an embodiment of a vehicle lamp according to the disclosure is shown as, but not limited to, a motorcycle headlight. The vehicle lamp of the embodiment includes a reflective housing 1, a lighting unit 2, a lens 3, an optical transparent member 4 and a light directing unit 5.

The reflective housing 1 is composed of a plurality of housing components, and has a housing wall 11 and a partition wall 12. The housing wall 11 has a reflective surface 111 and an installation space 110 bounded by the reflective surface 111. The partition wall 12 extends horizontally and divides the installation space 110 into two regions arranged one above the other. The reflective surface 111 reflects part of light rays from the lighting unit 2 toward the lens 3.

The lighting unit 2 is installed in the installation space 110, and includes a plurality of first light emitters 21 and second light emitters 22. The first light emitters 21 are mounted on a top surface of the partition wall 12 and are spaced apart from each other in a left-right direction of the lighting unit 2. The second light emitters 22 are mounted on a bottom surface of the partition wall 12 and are spaced apart from each other in the left-right direction. Each first light emitter 21 produces a low beam light. Each second light emitter 22 produces a high beam light. Notably, there can be one first light emitter 21 and one second light emitter 22 in some embodiments.

The lens 3 is disposed in front of the lighting unit 2 for radiating forwardly light rays received from the lighting unit 2 to effect lighting. In this embodiment, the lens 3 is a convex lens providing a light condensation effect.

The optical transparent member 4 protrudes sidewardly from one side of the lens 3. The lens 3 and the optical transparent member 4 are juxtaposed with each other along the left-right direction. In implementing the vehicle lamp, the optical transparent member 4 may be connected to one of left and right sides of the lens 3. In this embodiment, the lens 3 and the optical transparent member 4 are made from a same light transmitting material and are integrally formed as one piece with each other.

The light directing unit 5 is disposed between the lighting unit 2 and the optical transparent member 4 for forwardly directing part of light rays emitted from the lighting unit 2 to the optical transparent member 4. The optical transparent member 4 radiates forwardly the light rays received from the light directing unit 5, whereby a light emitting area of the vehicle lamp of the disclosure is increased. In this embodiment, the light directing unit 5 includes a first reflective lens 51, a second reflective lens 52 and a light guide rod 53.

The first reflective lens 51 is disposed at a position anterior to and higher than the lighting unit 2, and protrudes integrally and forwardly from the reflective housing 1 toward the optical transparent member 4. The first reflective lens 51 has a reflective surface facing downwardly to reflect and focus part of light rays emitted from the lighting unit 2 to a point, thereby forming a virtual light source.

The second reflective lens 52 is anterior to the first reflective lens 51. In this embodiment, the second reflective lens 52 has a front end proximal to the optical transparent member 4, a rear end below a front end of the first reflective lens 51, and a reflective surface facing upwardly. The reflective surface of the second reflective lens 52 reflects light rays of the virtual light source to the optical transparent member 4.

The light guide rod 53 is disposed between the lighting unit 2 and the optical transparent member 4. In this embodiment, the light guide rod 53 has a light enter surface 531 proximal to the second light emitters 22, and a light exit surface 532 proximal to the optical transparent member 4. As such, the guide rod 53 is able to guide part of light rays from the second light emitters 22 to the optical transparent member 4.

Figure 5:
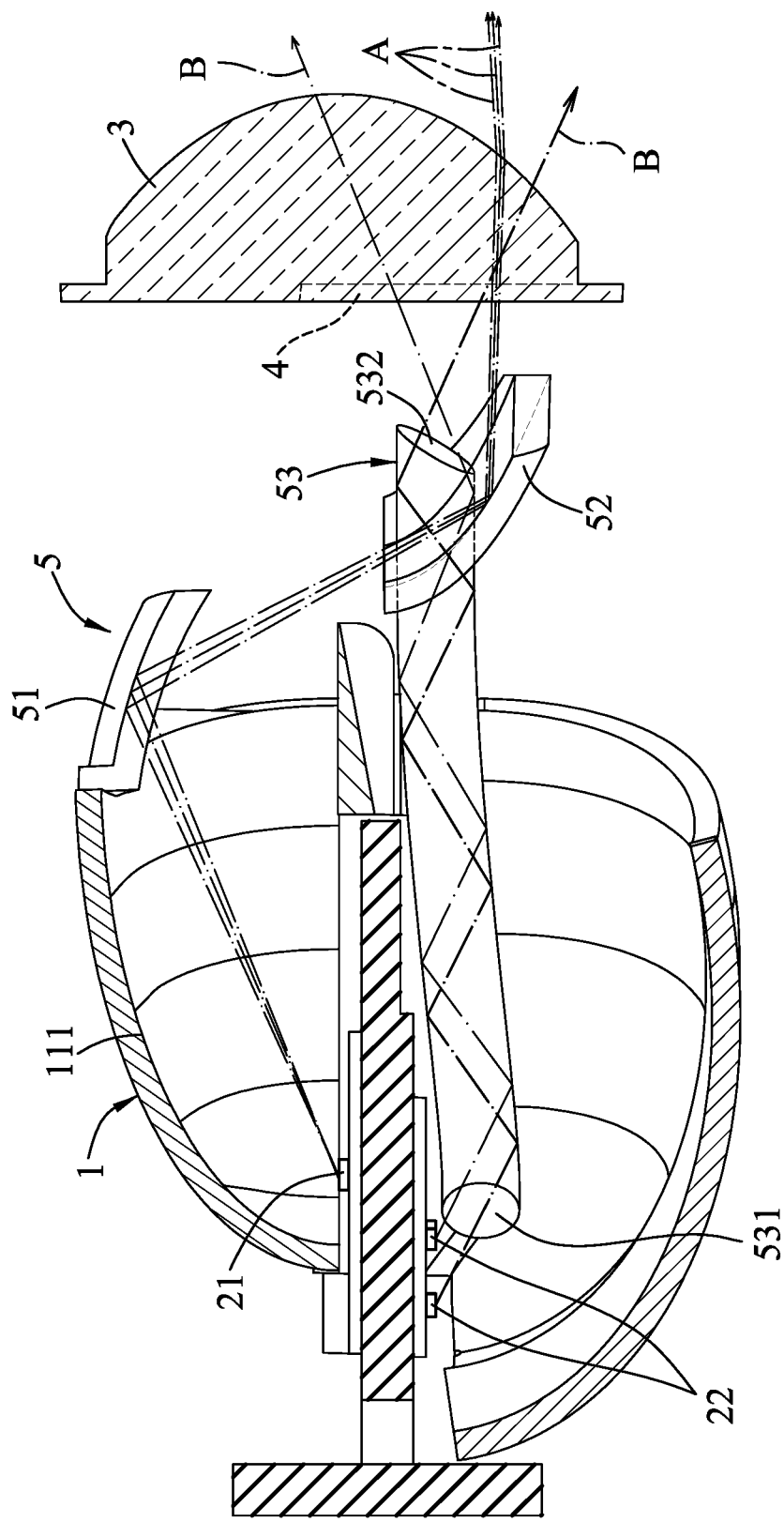
FIG. 5 is a sectional view of the embodiment illustrating light paths (A) and (B) of the vehicle lamp.
Figure 6:
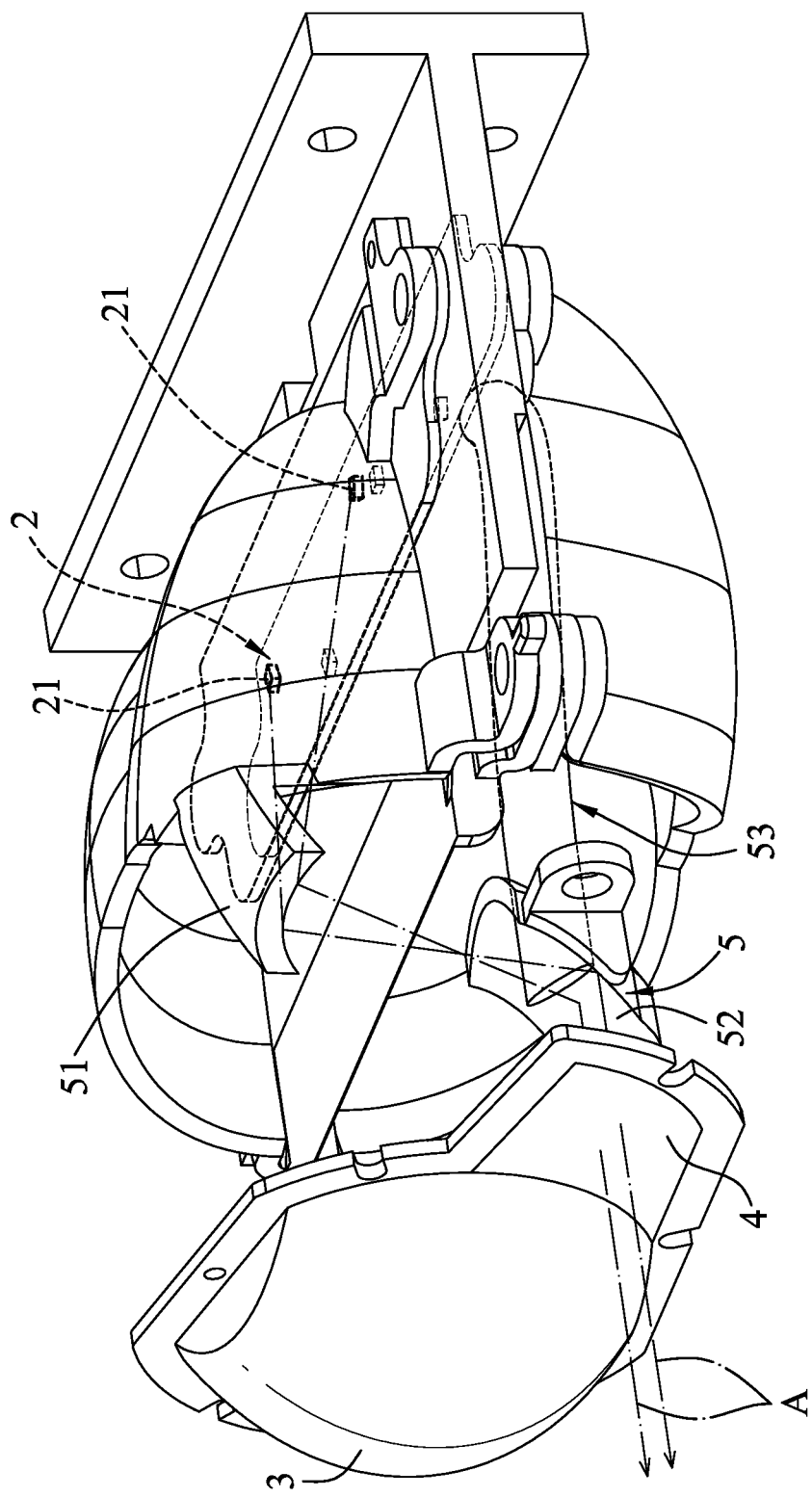
FIG. 6 is a perspective view illustrating the light path (A) of the vehicle lamp of the embodiment.

Referring to FIGS. 5 and 6, to produce the low beam light, the first light emitters 21 are activated while the second light emitters 22 are deactivated. The first light emitters 21 emit light rays upwardly to a top portion of the reflective surface 111 above the partition wall 12. Part of the light rays from the first light emitters 21 are reflected by the top portion of the reflective surface 111 toward the lens 3 to emit a low beam light (not shown). Part of the light rays from the first light emitters 21 are radiated to and reflected by the first reflective lens 51 (see light path (A) shown in FIGS. 5 and 6) toward the second reflective lens 52. The second reflective lens 52 reflects the light rays from the first reflective lens 51 toward the optical transparent member 4. The optical transparent member 4 radiates forwardly the light rays along the light path (A). As such, a region in front of the optical transparent member 4 is illuminated. The optical transparent member 4 associated with the lens 3 increases the overall light emitting area of the vehicle lamp of the disclosure, compared to a conventional vehicle lamp. In the conventional vehicle lamp, when a low beam light is turned on, illumination above a cut-off line is generally insufficient, thereby forming a dark region, which cannot sufficiently illuminates higher street names or road signs. This can lead to unsafe driving. By virtue of the structure and design of the combined first and second reflective lenses 51, 52, light rays radiated forwardly by the optical transparent member 4 can be directed to the dark region slightly above the cut-off line, thereby assisting in illuminating the dark region and enhancing driving safety.

When the second light emitters 22 is turned on, the vehicle lamp of the disclosure is switched to the high beam light mode. On the other hand, when an optical test is carried out before the vehicle lamp of the disclosure leaves the factory, the first and second light emitters 22 can be simultaneously turned on or activated. However, during driving, the low beam light mode of the vehicle lamp is deactivated, and the second light emitters 22 radiate light rays downwardly. Part of the light rays from the second light emitters 22 are reflected by a bottom portion of the reflective surface 111 toward the lens 3 to form a high beam pattern (not shown). As shown in FIG. 5, part of light rays from the second light emitters 22 enter into the light guide rod 53 through the light enter surface 531 of the light guide rod 53 as shown by lines of light path (B). The guide rod 53 guides the part of light rays to exit the light exit surface 532 of the light guide rod 53 toward the optical transparent member 4. The optical transparent member 4 radiates forwardly the light rays to form a lighted region in front of the optical transparent member 4. By association with the lens 3, the optical transparent member 4 increases the light emitting area of the vehicle lamp of the disclosure.

Accordingly, no matter whether the low beam or high beam light mode is in use, with use of the optical transparent member 4 and the light directing unit 5, the light emitting area of the vehicle lamp can be increased. Further, because the lighted regions formed by the optical transparent member 4 and the lens 3 overlap each other, the luminous intensity of the low beam or the high beam light can be enhanced.

Figure 7:
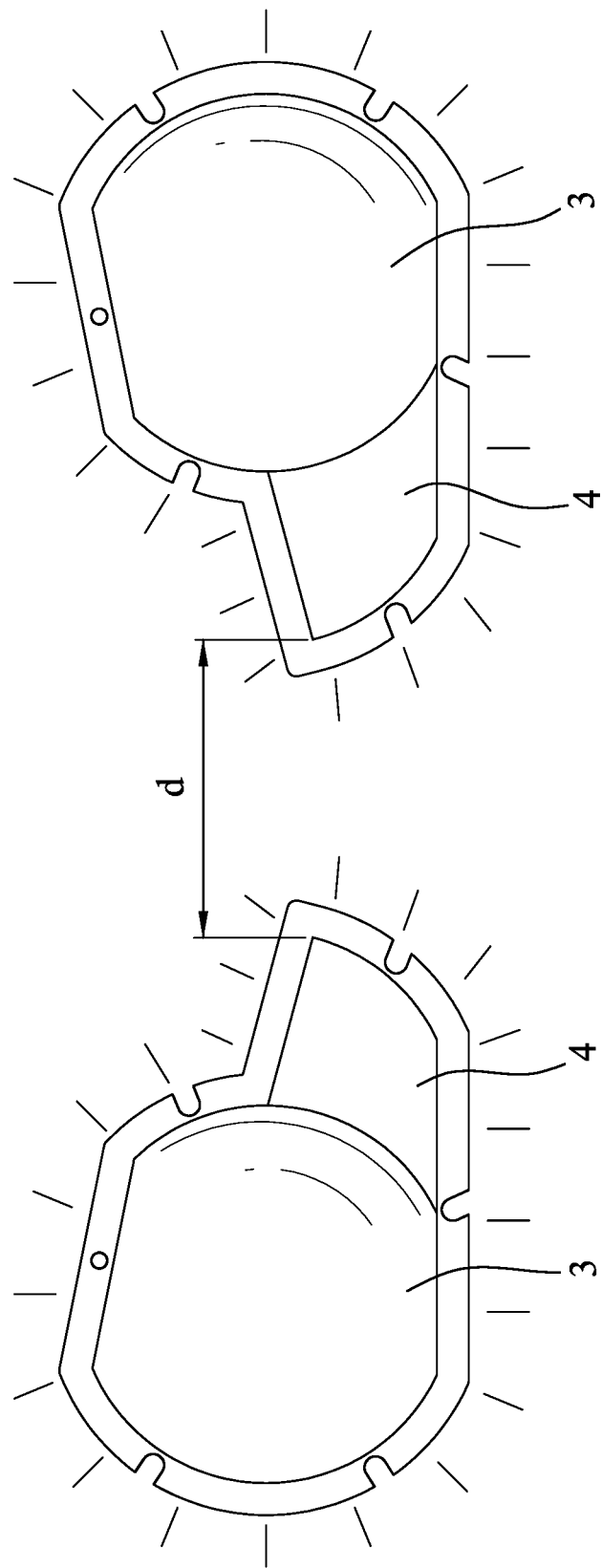
FIG. 7 is a front view illustrating two vehicle lamps of the disclosure disposed at left and right sides.

As shown in FIG. 7, when two vehicle lamps of the disclosure are mounted respectively to left and right sides of a vehicle in such a manner that the optical transparent members 4 are in between the vehicle lamps, the light emitting areas of the vehicle lamps increase in directions toward each other. As such, the boundaries of the light emitting areas of the two vehicle lamps approach each other, and the distance between the boundaries is reduced to a distance (d) between the optical transparent members 4, which is smaller than or equal to 75 mm. Therefore, the two vehicle lamps of the disclosure can be declared as a single lamp according to the ECE regulations. During an optical test, the two vehicle lamps can be activated simultaneously to test whether or not the two vehicle lamps of the disclosure can meet the requirements of Class D headlamp according to the ECE regulations. Because it is unnecessary to individually or independently test the two vehicle lamps, the vehicle lamp of the disclosure can be designed and manufactured easily at relatively low costs. On the other hand, because the illumination requirements of headlamps according to the ECE regulations can be fulfilled with less amount of the first and second light emitters 21, 22, it is beneficial to downsize the vehicle lamp of the disclosure, to save energy, and to reduce the number of heat sinks (not shown). Besides, because the two vehicle lamps of the disclosure together can share energies and heat dispensation efficiencies of the light emitters, it is helpful to dissipate heat when the two vehicle lamps of the disclosure are considered to be the single lamp.

While the embodiment of the vehicle lamp of the disclosure is exemplified as having low beam and a high beam light modes, the vehicle lamp of the disclosure having the construction capable of increasing the light emitting area as described herein before can also be used as a fog lamp, a daytime running lamp, etc.

In addition, by virtue of the light directing unit 5 directing part of light rays from the first or second light emitters 21, 22 to the optical transparent member 4, the light emitting area of the vehicle lamp of the disclosure is increased without using any additional lighting source. The light directing unit 5 and the optical transparent member 4 are therefore advantageous to reduce fabrication cost of the vehicle lamp of the disclosure.

In the description above, for the purposes of explanation, numerous specific details have been set forth in order to provide a thorough understanding of the embodiment). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A vehicle lamp, comprising:
    a lighting unit;
    a lens disposed in front of said lighting unit for radiating forwardly light rays received from said lighting unit;
    an optical transparent member protruding sidewardly from one of left and right sides of said lens;
    a reflective housing having a reflective surface and an installation space bounded by said reflective surface, said lighting unit being installed in said installation space, said reflective surface reflecting part of light rays from said lighting unit toward said lens; and
    a light directing unit disposed between said lighting unit and said optical transparent member for forwardly directing a part of light rays emitted from said lighting unit to said optical transparent member,
    said optical transparent member radiating forwardly the light rays received from said light directing unit, whereby a light emitting area of said vehicle lamp is increased,
    wherein said light directing unit includes a first reflective lens disposed at a position anterior to and higher than said lighting unit, and a second reflective lens that is anterior to said first reflective lens,
    wherein said reflective housing further has a rear end disposed rearwardly of said lighting unit and a front end proximal to said lens and said optical transparent member, said first reflective lens being formed as a shallow concave plate that has a rear end disposed at an upper side of said front end of said reflective housing, a front end protruding forwardly away from said rear end of said first reflective lens, and a shallow concave surface that faces downwardly between said front and rear ends of said first reflective lens and beyond said front end of said reflective housing, said first reflective lens reflecting and focusing a part of light emitted from said lighting unit to form a virtual light source,
    wherein said second reflective lens has a front end proximal to said optical transparent member, a rear end that is disposed beyond said front end of said reflective housing and below said front end of said first reflective lens, and a shallow concave surface facing upward between said front and rear ends of said second reflective lens, said second reflective lens reflecting light rays of the virtual light source to said optical transparent member.

2. The vehicle lamp as claimed in claim 1, wherein said light directing unit further includes a light guide rod disposed between said lighting unit and said optical transparent member to guide part of light rays from said lighting unit to said optical transparent member.

3. The vehicle lamp as claimed in claim 1, wherein said light directing unit further includes a light guide rod disposed between said lighting unit and said transparent member to guide part of light rays from said lighting unit to said optical transparent member.

4. The vehicle lamp as claimed in claim 3, wherein said lighting unit includes at least one first light emitter and at least one second light emitter, said first reflective lens reflecting part of light rays from said at least one first light emitter to said second reflective lens, said light guide rod guiding part of light rays from said at least one second light emitter toward said optical transparent member.

5. The vehicle lamp as claimed in claim 4, wherein said at least one first light emitter produces a low beam light, said at least one second light emitter producing a high beam light.

6. The vehicle lamp as claimed in claim 1, wherein said lens and said optical transparent member are juxtaposed with each other along a left-right direction of said lighting unit.

7. The vehicle lamp as claimed in claim 1, wherein said lens is a convex lens, and said optical transparent member is a transparent plate.

* * * * *